United States Patent

[11] 3,598,195

| [72] | Inventor | Phillip Steller<br>Great Neck, N.Y. |
|---|---|---|
| [21] | Appl. No. | 818,499 |
| [22] | Filed | Apr. 23, 1969 |
| [45] | Patented | Aug. 10, 1971 |
| [73] | Assignee | Stelber Industries, Inc.<br>Elmhurst, N.Y. |

[54] ELECTRIC TRICYCLE
4 Claims, 8 Drawing Figs.

[52] U.S. Cl. ..................... 180/27, 180/65, 180/34
[51] Int. Cl. ..................... B60l 11/18, B62k 11/00
[50] Field of Search ..................... 180/25, 26, 27, 65, 11, 34

[56] References Cited

UNITED STATES PATENTS

| 656,323 | 8/1921 | Hansel | 180/34 |
| 1,333,121 | 3/1920 | La Roche | 180/27 |
| 2,917,122 | 12/1959 | Quisenberry | 180/25 |

FOREIGN PATENTS

| 443,948 | 2/1968 | Switzerland | 180/25 |

Primary Examiner—Benjamin Hersh
Assistant Examiner—Milton L. Smith
Attorney—Ostrolenk, Faber, Berb & Soffen ABSTRACT: A tricycle is provided with a battery-powered drive motor as well as pedal-operated drive means so connected that either of the drive means may be used alone or may be used in combination to supplement each other. Both drive means supply power to the rear axle and the rear wheels are mounted so as to rotate at different speeds when the tricycle is being turned.

PATENTED AUG 10 1971 3,598,195
SHEET 1 OF 3
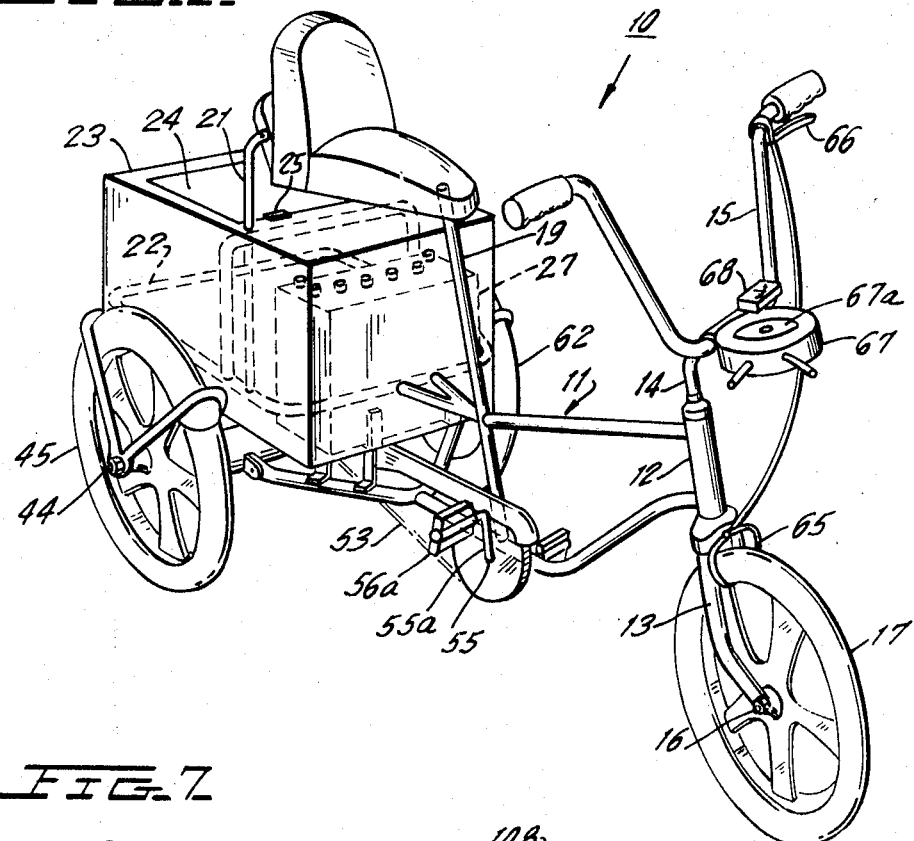
FIG. 1
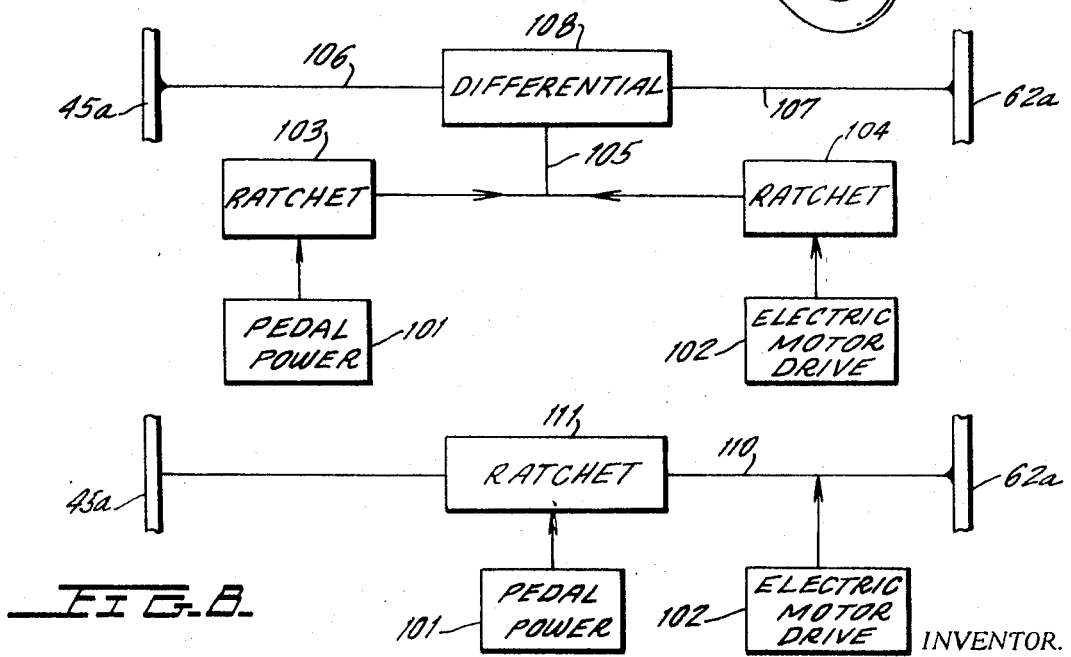
FIG. 7
FIG. 8
INVENTOR.
PHILLIP STELLER
BY
OSTROLENK, FABER, GERB & SOFFEN
ATTORNEYS

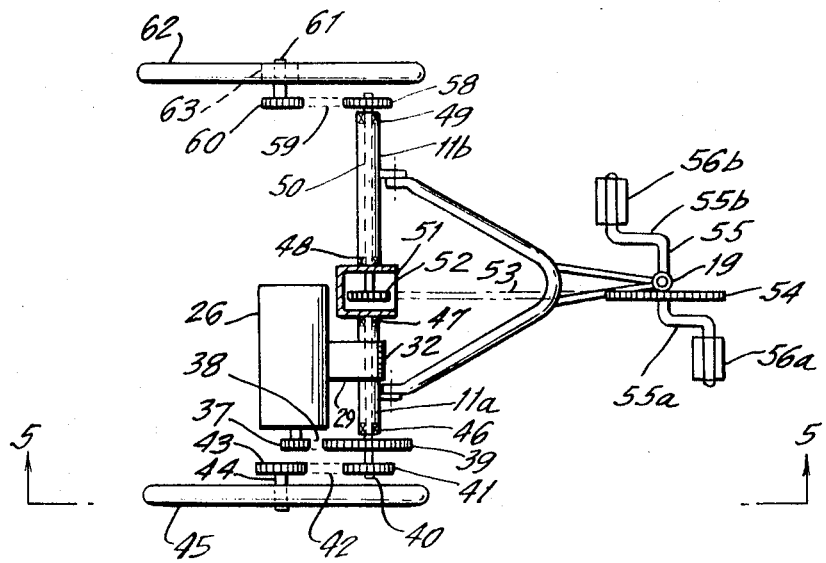
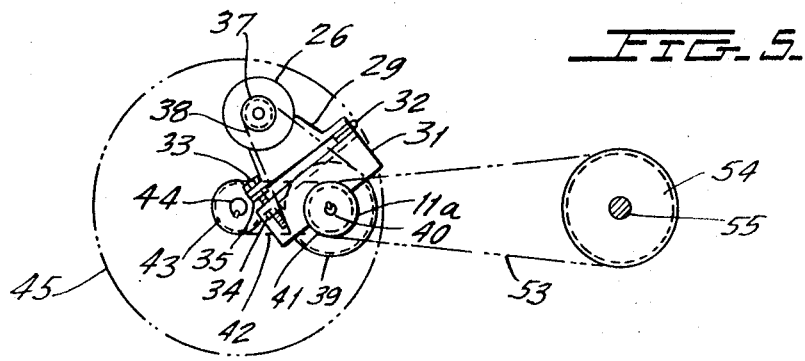
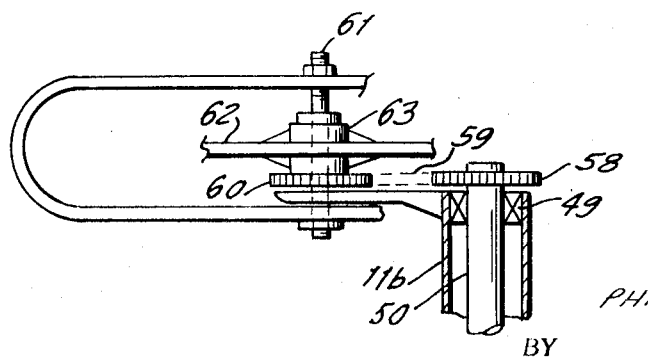

ELECTRIC TRICYCLE

This invention relates to tricycles in general, and more particularly relates to tricycles that are operated by both foot and electric motor power.

For the most part, the prior art has provided tricycles as toys for children with such tricycles being operated solely by foot power. Recently, adults have found that pedalling of a tricycle provides beneficial exercise, and in some instances tricycles have been used to transport merchandise. However, transporting heavy loads often becomes hard work, especially when travelling uphill.

Thus, the instant invention provides a battery-powered electric motor drive to be used in place of, or supplementary to, the conventional pedal drive. The choice of whether to use one or the other of the two drives or to use them in combination is easily made by the rider. Use of both drives in combination is especially advantageous on starting and when travelling uphill, in that the use of pedal power reduces load on the motor thereby reducing consumption of power from the battery when drain therefrom would otherwise be at its highest.

Using pedal power to the exclusion of motor power provides maximum exercise for the rider. Conversely, using motor power to the exclusion of pedal power provides operation with the least effort for the rider.

As will hereinafter be seen, even though both pedal power and motor power are supplied to the rear axle the rear wheels are free to turn at different speeds thereby avoiding skidding that would otherwise occur during turning of the tricycle in the event that the rear wheels were locked together to rotate in unison.

Accordingly, a primary object of the instant invention is to provide a novel construction for a velocipede provided with a battery-operated motor.

Another object is to provide a tricycle in which both pedal power and electric motor power are supplied to the rear axle, and the rear wheels are free to rotate at different speeds as the tricycle negotiates a curve.

Another object is to provide a tricycle of this type having a split rear axle, with pedal power being furnished to one axle portion and motor power being furnished to the other axle portion.

A further object is to provide a tricycle of this type in which pedal power and motor power are applied through overrunning clutches and differential gearing to drive the rear wheels of the tricycle.

A still further object is to provide a tricycle of this type in which one rear wheel is directly driven by an electric motor, and pedal power is applied through an overrunning clutch to drive the same rear wheel.

These objects as well as other objects of this invention will become readily apparent after reading the following description of the accompanying drawings in which:

FIG. 1 is a perspective of a tricycle constructed in accordance with teachings of the instant invention.

FIG. 4 is a fragmentary cross section taken through line 4—4 of FIG. 2, looking in the direction of arrows 4—4.

FIG. 5 is a cross section taken through line 5—5 of FIG. 4, looking in the direction of arrows 5—5.

FIG. 6 is a fragmentary plan view of the driving connection to the pedal-driven wheel.

FIGS. 7 and 8 are each schematics showing different modifications for the driving connection from the electric motor and pedal-operated drives.

Figure 2:
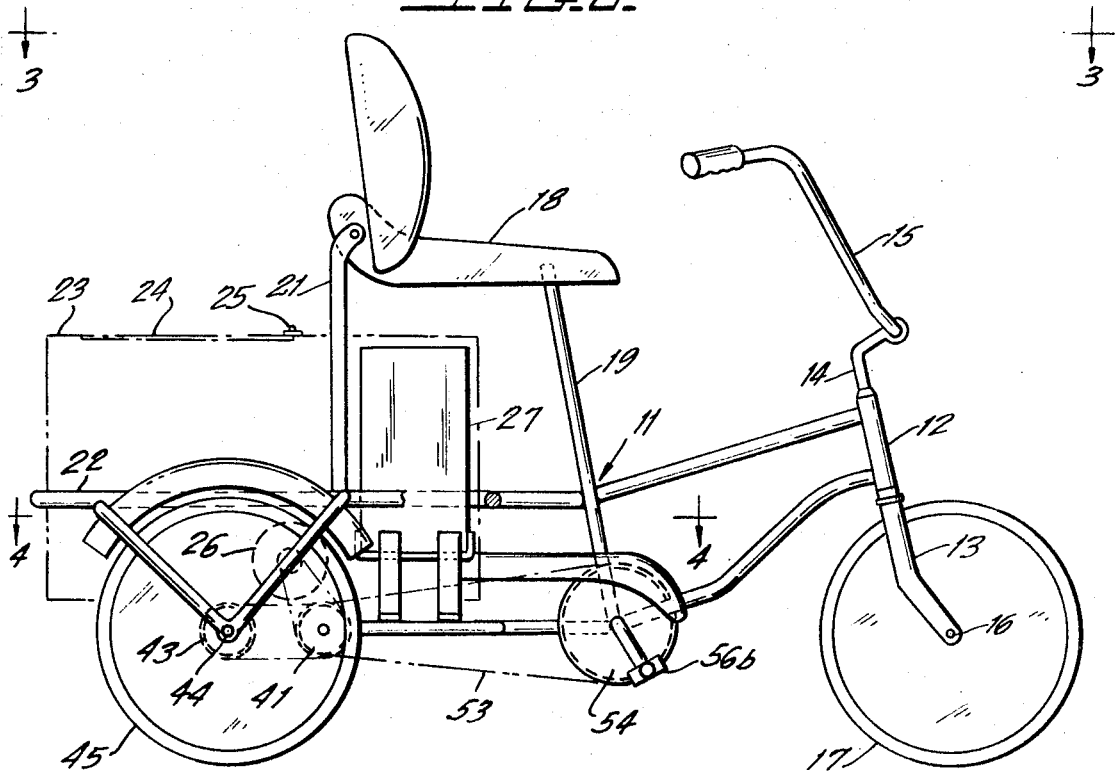
FIG. 2 is a side elevation of the tricycle of FIG. 1.
Figure 3:
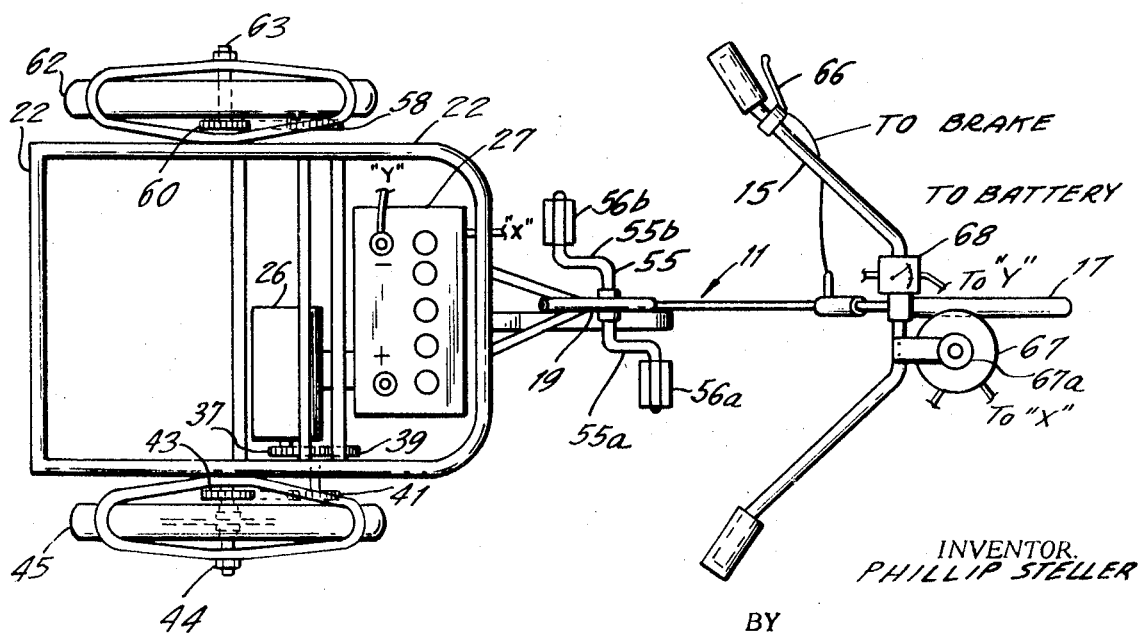
FIG. 3 is a plan view, looking in the direction of arrows 3—3 of FIG. 2.

Now referring to the figures and more particularly to FIGS. 1—6. Tricycle 10 includes tubular frame 11 having post bearing portion 12 at the front thereof pivotally supporting the upper extension of fork 13. Post 14, secured to fork 13, in a conventional manner, is clamped to the central portion of handle bar 15. The lower end of fork 13 supports subshaft 16 upon which front wheel 17 is rotatably mounted.

The front portion of seat or saddle 18 is mounted to the upper end of frame post 19, while the rear portion of saddle 18 is supported on opposite sides thereof by spaced frame posts 21. To the rear of saddle 18 frame 11 is formed as horizontal rectangle 22 which supports housing 23. The upper wall of housing 23 includes lid 24 pivotally mounted to hinges 25. A basket (not shown) is intended to be positioned below lid 24 and be supported by frame 11 for the carrying of packages. The front portion of housing 23 encloses electric motor 26 and battery 27 for energizing motor 26.

Mounting flange 29 of motor 26 is pivotally connected to bracket 31 at hinges 32, with bracket 31 being fixedly secured to frame tube 11a. Screw 33, extending through the edge of flange 29 opposite hinge 32, is received by a threaded aperture in bracket 31 for adjusting the position of flange 29 relative to bracket 31. Locknut 34 maintains the adjusted position, while spring retainer 35 prevents axial motion of screw 33, relative to flange 29. Sprocket 37 mounted to the output shaft of motor 26 drives chain 38 in mesh with sprocket 39 keyed to shaft 40. Another sprocket 41 keyed to shaft 40 drives chain 42, which in turn drives sprocket 43 keyed to stub shaft 44, also having rear wheel 45 keyed thereto.

Shaft 40 is rotatably mounted in bearings 46, 47, disposed within tube 11a at opposite ends thereof. Frame tube 116, in axial alignment with tube 11a, houses bearings 48, 49 at opposite ends thereof. The latter rotatably support shaft 50 which extends through tube 11b. The adjacent ends of tubes 11a, 11b are mechanically connected in end to end spaced relationship by housing 51. Sprocket 52 disposed within housing 51 and keyed to shaft 50 is driven by chain 53, in mesh with sprocket 54. The latter is keyed to shaft 55, pivotally mounted to frame 11, and is provided with oppositely offset cranks 55a, 55b, having pedals 56a, 56b, respectively, at their free ends.

Sprocket 58, keyed to shaft 50 and positioned at the outer end of tube 11b, drives chain 59 which in turn drives sprocket 60 keyed to stub shaft 61 at the input for hub assembly 63 of wheel 62. Hub assembly 63 includes a conventional overrunning clutch and coaster brake assembly, such coaster brake being operated by pedals 56a, 56b to stop rotation of wheel 62 when an attempt is made to rotate cranks 55a, 55b in reverse. Conventional caliper brake 65, controlled by handle bar-mounted lever 66, is effective to stop rotation of front wheel 17.

Rheostat 67 and ammeter 68, both mounted to handle bar 15, are connected together in electrical series combination, with such combination being connected in series with the series combination of motor 26 and battery 27. As should be apparent to those skilled in the electrical arts, operation of rheostat 67 is effective to control the amount of battery voltage applied to motor 26, thereby controlling the power input to the latter, to control the speed thereof. Ammeter 68 indicates the instantaneous current drain from battery 27, this being an indication of the load on motor 26. Should such load become excessive it can be reduced by increasing the amount of pedalling effort being exerted.

It is noted that when handle 67A of rheostat 67 reaches its high resistance position, a switch (not shown) in series with rheostat 67 is operated to OPEN position. It is also noted that insulated wires (not shown), electrically connecting the electrical elements 26, 27, 67, pass through certain frame tubes and/or are clipped to the outside of the frame.

In the embodiment of tricycle 10 illustrated in FIGS. 1—6, the provision of split axle 40, 50 permits wheels 45 and 62 to rotate at different speeds to prevent skidding when tricycle 10 is negotiating a curve. Further, the provision of split axle 40, 50 permits tricycle 10 to be driven either from electric motor 26 or by foot power applied at pedals 56a, 56b, or to be driven from both in combination. It is also noted that while rheostat 67 is illustrated as being connected directly in series with motor 26 to control energization thereof, it should be apparent to those skilled in the art that energization of motor 26 may be controlled by a conductively controllable solid state unit which may include silicon-controlled rectifiers.

It should be clear to those skilled in the art that with minor modifications sprockets 41, 43 and their connecting chain 42 may be eliminated, and similarly sprockets 58, 60 and their connecting chain 59 may also be eliminated.

In the embodiment of FIG. 7, pedal power 101 and motor power 102 are applied through overrunning clutches or ratchets 103, 104, respectively, to input 105 of differential gearing unit 108. Differential outputs 106, 107 are directly connected to drive tricycle rear wheels 45a, 62a, respectively.

In the embodiment of FIG. 8, electric motor drive 102 is operatively connected to directly drive common shaft 110, while pedal power 101 is applied through ratchet 111, to drive common shaft 110 in a forward direction. Rear wheel 45a is freely mounted for rotation at one end of shaft 110 while the other rear wheel 62a is keyed to shaft 110 at the other end thereof. A clutch (not shown) may be interposed between motor 102 and shaft 110.

Thus, it is seen that the instant invention provides a novel construction for a tricycle that may be selectively driven either by electric motor power or power supplied by the rider, or by a combination of both types of power. Motor and foot power are applied to the rear wheels in a relatively inexpensive and reliable manner with the rear wheels being mounted to rotate at different speeds when the tricycle is negotiating a curve.

Although there have been described preferred embodiments of this novel invention, many variations and modifications will now be apparent to those skilled in the art. Therefore, this invention is to be limited, not by the specific disclosure herein, but only by the appending claims.

The embodiments of the invention I claim in which an exclusive privilege or property are defined as follows.

1. A cycle including a frame; first wheel means; means defining a first rotational axis for said first wheel means; said first axis being mounted to said frame at one end thereof for relative pivotal motion about a generally vertical axis; second wheel means; means defining a second rotational axis for said second wheel means; said second axis being mounted to said frame in fixed position relative thereto and disposed at the other end thereof; pedal means rotatably mounted on said frame for supplying foot power to rotate said second wheel means; a battery and an electric motor on said frame for providing additional power to rotate said second wheel means; control means selectively operable to control energization of said motor by said battery; means connecting said pedal means and said motor to said second means to selectively power the latter at any given time from the combination of said pedal means and said motor, or from either of them while the other remains inactive; said second wheel means including first and second wheels mounted for rotation at different speeds while said cycle is turning; said means defining said second rotation axis including a split axle comprising first and second independently rotatable axially aligned sections; said pedal means operatively connected to said first section to supply power to said first wheel; said motor operatively connected to said second section to supply power to said second wheel.

2. A cycle as set forth in claim 1, in which there is an overrunning clutch connecting said pedal means to said first section of said split axle.

3. A cycle as set forth in claim 1, in which there is a seat mounted to said frame in front of said second rotational axis; both said battery and said motor positioned behind said seat.

4. A cycle as set forth in claim 3, in which said first wheel means comprises a single wheel positioned in front of said seat.